United States Patent
Okamoto et al.

(10) Patent No.: US 11,008,954 B2
(45) Date of Patent: May 18, 2021

(54) DISPLAY DEVICE

(71) Applicant: Nissan Motor Co., Ltd., Kanagawa (JP)

(72) Inventors: Kazuhiko Okamoto, Kanagawa (JP); Takumi Nakamura, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 16/333,509

(22) PCT Filed: Sep. 14, 2016

(86) PCT No.: PCT/JP2016/077036
§ 371 (c)(1),
(2) Date: Mar. 14, 2019

(87) PCT Pub. No.: WO2018/051420
PCT Pub. Date: Mar. 22, 2018

(65) Prior Publication Data
US 2019/0257252 A1    Aug. 22, 2019

(51) Int. Cl.
*F02D 15/02* (2006.01)
*G01D 7/00* (2006.01)
(Continued)

(52) U.S. Cl.
CPC .............. *F02D 15/02* (2013.01); *B60K 35/00* (2013.01); *F02D 15/00* (2013.01); *G01D 7/00* (2013.01);
(Continued)

(58) Field of Classification Search
CPC ......... F02D 15/02; F02D 29/02; B60K 35/00; B60K 37/02; B60K 2350/1092; B60K 2350/2008; G01D 7/00; G01D 7/005
See application file for complete search history.

(56) References Cited

U.S. PATENT DOCUMENTS 5,638,498 A * 6/1997 Tyler ...................... G06K 15/00
                                                            358/1.16
5,786,531 A    7/1998 Lewis et al.
(Continued)

FOREIGN PATENT DOCUMENTS

JP    S59-150951 U    10/1984
JP    2006-46149 A    2/2006
(Continued)

*Primary Examiner* — Logan M Kraft
*Assistant Examiner* — Johnny H Hoang
(74) *Attorney, Agent, or Firm* — Osha Bergman Watanabe & Burton LLP (57) ABSTRACT

A display device for an internal combustion engine includes a variable compression ratio mechanism structured to vary an engine compression ratio of the internal combustion engine. The display device includes an indicator structured to vary its indication depending on the engine compression ratio. The indicator is configured to maintain the indication constant or within a slight change with respect to a change in the engine compression ratio within each of at least one of first and second dead zones of the engine compression ratio. The first dead zone includes a vicinity of an upper limit of the engine compression ratio including the upper limit. The second dead zone includes a vicinity of a lower limit of the engine compression ratio including the lower limit.

18 Claims, 7 Drawing Sheets

(51) Int. Cl.
     *B60K 35/00*     (2006.01)
     *F02D 15/00*     (2006.01)
     F02B 75/04     (2006.01)
     F02D 41/24     (2006.01)

(52) U.S. Cl.
     CPC ...... *G01D 7/005* (2013.01); *B60K 2370/1523* (2019.05); *F02B 75/04* (2013.01); *F02D 41/2474* (2013.01); *F02D 2200/0625* (2013.01); *F02D 2200/606* (2013.01); *F02D 2700/03* (2013.01)

(56) References Cited

U.S. PATENT DOCUMENTS

| | | | | |
|---|---|---|---|---|
| 5,991,515 | A * | 11/1999 | Fall | G06T 9/00 358/1.12 |
| 7,360,513 | B2 * | 4/2008 | Takemura | F02B 75/048 123/48 B |
| 2011/0241864 | A1 * | 10/2011 | Fujiki | B60K 35/00 340/439 |
| 2015/0217684 | A1 * | 8/2015 | Frens | G01D 11/28 362/23.14 |
| 2018/0202371 | A1 * | 7/2018 | Matsuoka | B60K 35/00 |
| 2019/0163404 | A1 * | 5/2019 | Pedersen | G06F 3/0661 |

FOREIGN PATENT DOCUMENTS

| | | |
|---|---|---|
| JP | 2006-226133 A | 8/2006 |
| JP | 2011-257429 A | 12/2011 |

\* cited by examiner

SPORT MODE

FIG. 6B

ECONOMY MODE

FIG. 7

DISPLAY DEVICE

BACKGROUND

Technical Field

The present invention relates to a display device for an internal combustion engine including a variable compression ratio mechanism structured to vary an engine compression ratio of the internal combustion engine.

Related Art

Patent Document 1 discloses an art for showing on a display an instantaneous fuel efficiency of a vehicle during a predetermined short time period, wherein the instantaneous fuel efficiency is calculated on the basis of a fuel consumption and a travel distance of the vehicle, and wherein the travel distance is calculated on the basis of a vehicle speed of the vehicle.

Patent Document 1: JP 2011-257429 A

SUMMARY OF THE INVENTION

However, the instantaneous fuel efficiency fluctuates frequently in response to operation of an accelerator or changes of the vehicle speed. This may cause a phenomenon that operation of the accelerator causes a slight change in engine load or engine rotation speed in a direction to adversely affect the fuel efficiency, and thereby causes the adverse effect of the fuel efficiency to be displayed, even while the vehicle is actually driven in a fuel-efficient operation region. This might give a driver a strange feeling or false recognition of the driver failing to drive the vehicle in fuel-efficient operation. Therefore, there is still room for improvement in such a device for displaying on a display information about fuel efficiency, etc.

According to one or more embodiments of the present invention, a display device for a vehicle or the like provided with a variable compression ratio mechanism structured to vary an engine compression ratio of an internal combustion engine, comprises an indicator section structured to vary its indication depending on the engine compression ratio.

The indicator section is configured to maintain the indication constant or within a slight change with respect to a change in the engine compression ratio within each of at least one of first and second dead zones of the engine compression ratio, wherein the first dead zone includes a vicinity of an upper limit of the engine compression ratio including the upper limit, and wherein the second dead zone includes a vicinity of a lower limit of the engine compression ratio including the lower limit.

One or more embodiments of the present invention indicates a state of the engine compression ratio for a driver and thereby allow the driver to recognize the state of the engine compression ratio. Furthermore, provision of the dead zone serves to prevent the indication of the engine compression ratio from changing unexpectedly in the vicinity of the upper or lower limit, and thereby suppress such a strange feeling from being given to the driver.

DETAILED DESCRIPTION

Figure 1:
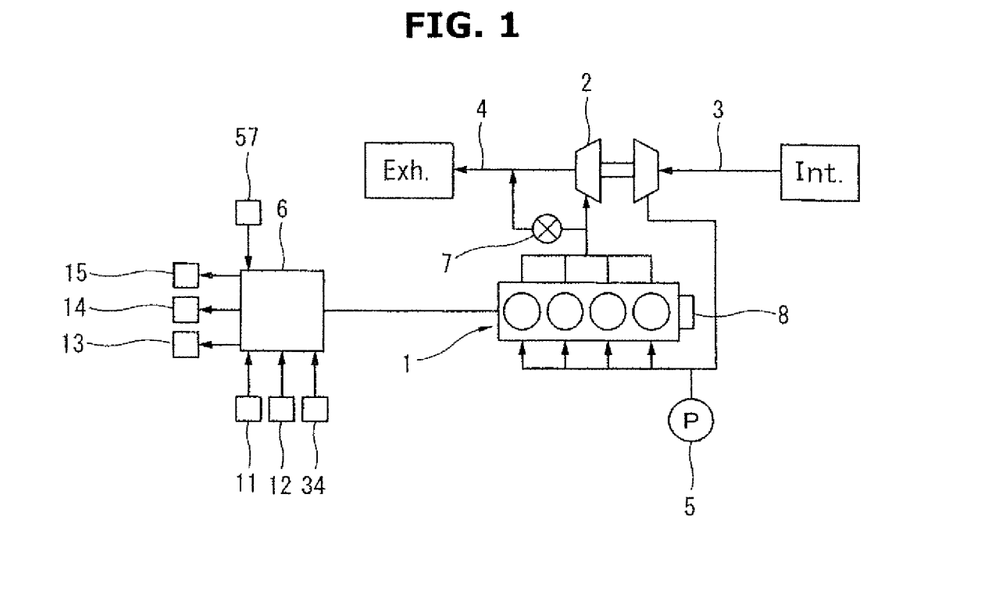
FIG. 1 is a configuration diagram of an example of internal combustion engine including a turbocharger, according to one or more embodiments of the present invention.

The following describes the present invention with reference to embodiments shown in the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. As shown in FIG. 1, an internal combustion engine 1 for a vehicle, to which first and second embodiments of the present invention are applied, includes a turbocharger 2 between an exhaust passage 4 and an intake passage 3, wherein turbocharger 2 is structured to supercharge intake air by using exhaust energy. Output power of internal combustion engine 1 is transferred to drive wheels through speed change of an automatic transmission 8.

A control unit 6 has a function to memorize and execute various engine controls. Control unit 6 receives input of signals from sensors such as an engine speed sensor 11 and an atmospheric pressure sensor 12 for sensing an atmospheric pressure in an upstream side of a throttle, and outputs control signals to a throttle valve 13, a fuel injection valve 14, a spark plug 15, etc., on the basis of the signals, and controls a throttle opening, a fuel injection quantity, a fuel injection timing, and an ignition timing, etc. Furthermore, control unit 6 regulates a boost pressure to a desired target boost pressure by adjusting an opening of an exhaust bypass valve 7 as a boost pressure regulation mechanism, wherein the regulation is based on a sensed value of the boost pressure acquired by a boost pressure sensor 5.

Figure 2:
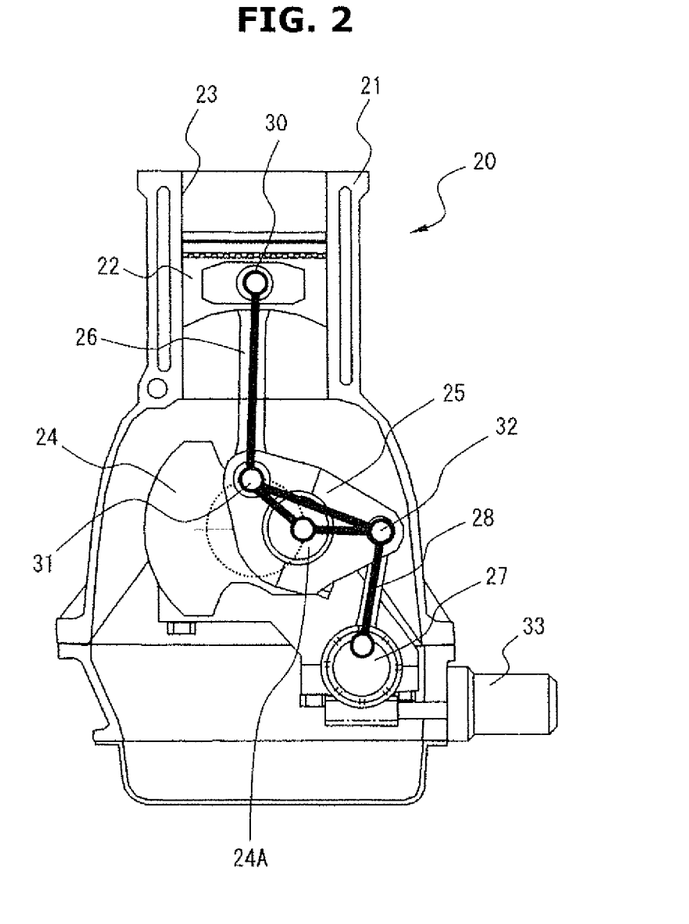
FIG. 2 is a configuration diagram of a variable compression ratio mechanism of the internal combustion engine.

FIG. 2 shows a variable compression ratio mechanism 20 employing a multi-link type piston-crank mechanism. This mechanism is briefly described here because it is publicly known as disclosed in JP 2006-226133 A. In a cylinder block 21 partially forming a body of the internal combustion engine, a piston 22 is fit inside each cylinder 23 slidably, and a crankshaft 24 is supported rotatably. Variable compression ratio mechanism 20 includes: a lower link 25 rotatably attached to a crankpin 24A of crankshaft 24; an upper link 26 connecting lower link 25 to piston 22; a control shaft 27 rotatably supported by the body of the internal combustion engine such as cylinder block 21; and a control link 28 connecting lower link 25 to control shaft 27 via an eccentric control shaft portion provided eccentrically at control shaft 27. Piston 22 is relatively rotatably connected to an upper end of upper link 26 via a piston pin 30. Lower link 25 is relatively rotatably connected to a lower end of upper link 26 via a first connecting pin 31, and is relatively rotatably connected to an upper end of control link 28 via a second connecting pin 32. A lower end of control link 28 is rotatably attached to the eccentric control shaft portion of control shaft 27.

Control shaft 27 is coupled to a drive motor 33 that serves as an actuator. Drive motor 33 changes and holds a rotational position of control shaft 27, and thereby changes an attitude of lower link 25, and piston stroke characteristics including positions of piston top dead center and bottom dead center, and an engine compression ratio. In this way, the engine compression ratio can be controlled according to an operating state of the engine by control of driving of drive motor 33 via control unit 6 (see FIG. 1). Specifically, control unit 6 performs feedback control on drive motor 33 on the basis of an actual compression ratio sensed by a control shaft sensor 34 (see FIG. 1) in a manner to keep the actual compression ratio in a vicinity of a target compression ratio, wherein the actual compression ratio is an actual value of the engine compression ratio varied by variable compression ratio mechanism 20, and wherein control shaft sensor 34 is provided to sense the rotational position of control shaft 27 corresponding to the actual compression ratio, and thereby serve as a device for sensing the actual compression ratio.

Figure 3:
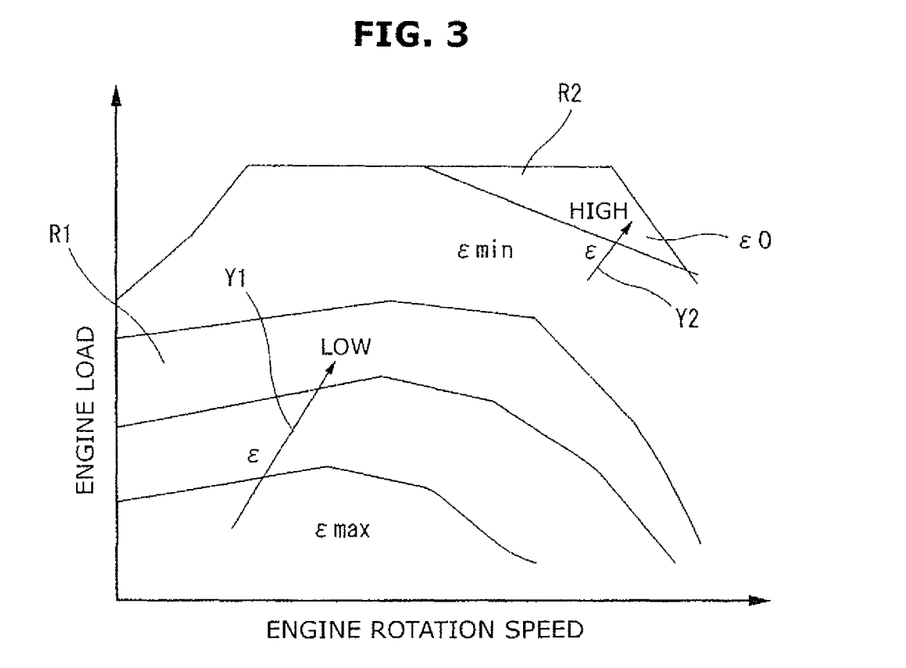
FIG. 3 is an explanatory chart showing a setting map of an engine compression ratio.

FIG. 3 is an explanatory chart showing a setting map of the engine compression ratio (target compression ratio). As shown in FIG. 3, the engine compression ratio is set on the basis of an engine torque, i.e. an engine load, and an engine rotation speed. Basically, in a major operation region (first operation region) R1, the engine compression ratio is set to increase for improving thermal efficiency and reducing fuel consumption with decrease in the engine load or the engine rotation speed, while the engine compression ratio is set to decrease for suppressing occurrences of knocking and pre-ignition with increase in the engine load or the engine rotation speed. Thus, as indicated by an arrow Y1, the engine compression ratio decreases with increase in the engine load and the engine rotation speed, when in the major operation region (first operation region) R1.

However, in a minor operation region (second operation region), namely, a maximum power region R2 in a vicinity of a spot of maximum power at an uppermost rightmost area in FIG. 3, the engine compression ratio is set to a value ε0 higher than a minimum compression ratio (ε0>εmin), to maximize the power as high as possible. Thus, as indicated by an arrow Y2, the engine compression ratio increases with increase in the engine load and the engine rotation speed, when in the maximum power region R2.

The first embodiment is exemplified such that the engine compression ratio is set to a maximum compression ratio in a vicinity of a spot of minimum power, but may be modified such that the engine compression ratio is set lower than the maximum compression ratio in the vicinity of the spot of minimum power, similar to the vicinity of the spot of maximum power.

Figure 4A:
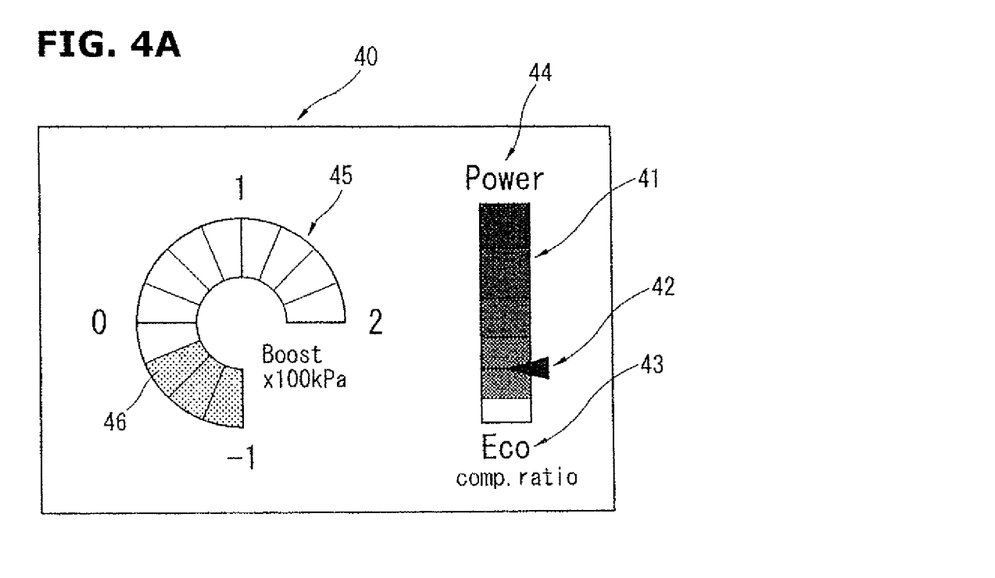
FIGS. 4A and 4B are views of a display indicating the engine compression ratio when in a state of high compression ratio and when in a state of low compression ratio, respectively.
Figure 4B:
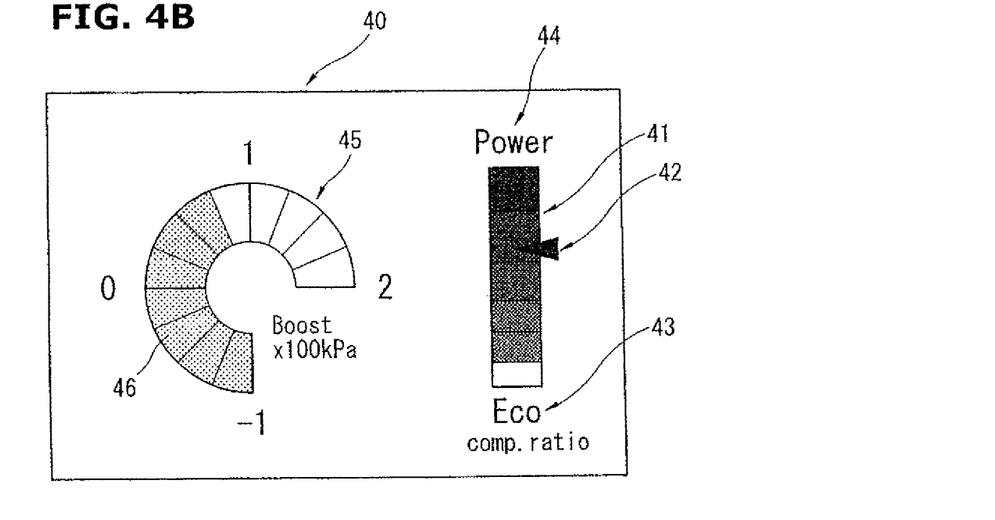

FIGS. 4A and 4B are explanatory views of a display 40 forming the display device according to the first embodiment of the present invention. Display 40 is arranged in a position visible from a driver. For example, display 40 is placed on an instrument panel or on a dashboard, or used as a display shared with a navigation system. Display 40 receives, from control unit 6, input of a control signal of the actual compression ratio sensed by control shaft sensor 34 and a control signal of the boost pressure sensed by boost pressure sensor 5.

As shown in FIGS. 4A and 4B, an indicator section 41 has a form of longitudinal bar graph divided into several steps, and includes a cursor 42 movable longitudinally to indicate the current engine compression ratio ("comp. ratio"). Cursor 42 moves downward as the engine compression ratio rises, and moves upward as the engine compression ratio falls. Below indicator section 41, a mark 43 ("Eco") indicating energy conservation is shown to clarify that raising the engine compression ratio improves the thermal efficiency and reduces the energy consumption. Above indicator section 41, a mark 44 ("Power") indicating high power is shown to clarify that lowering the engine compression ratio raises engine power, Additionally, the steps of indicator section 41 have color tones which vary step-by-step, to allow the state of the engine compression ratio to be easily grasped. For example, the color tones gradually become reddish to evoke high power as followed upward (toward low compression ratio side) in indicator section 41, and become greenish to evoke energy conservation as followed downward (toward high compression ratio side) in indicator section 41.

Furthermore, display 40 includes a boost pressure indicator section 45 to indicate a state of supercharging in addition to the indication of the engine compression ratio. Boost pressure indicator section 45 is implemented by a meter having a circular graph form divided into several steps, wherein a light-emitting zone 46 of the meter expands circumferentially in a clockwise direction as the boost pressure rises, and contracts circumferentially in a counterclockwise direction as the boost pressure falls. The meter is provided with a scale including marks "−1", "0", "1", "2" arranged in this order in the clockwise direction. The mark "0" indicates a pressure equivalent to the atmospheric pressure, and the mark "31 1" indicates a pressure of −100 kPa (negative pressure), and the mark "1" indicates a pressure of 100 kPa, and the mark "2" indicates a pressure of 200 kPa. The first embodiment employs both of turbocharger 2 and variable compression ratio mechanism 20, and thereby has a capability to raise the boost pressure to about 200 kPa. The further indication of the boost pressure on boost pressure indicator section 45 allows a state of high power to be recognized impressively.

FIG. 4A shows a state of high compression ratio and low boost pressure. FIG. 4B shows a state of low compression ratio and high boost pressure.

Figure 5:
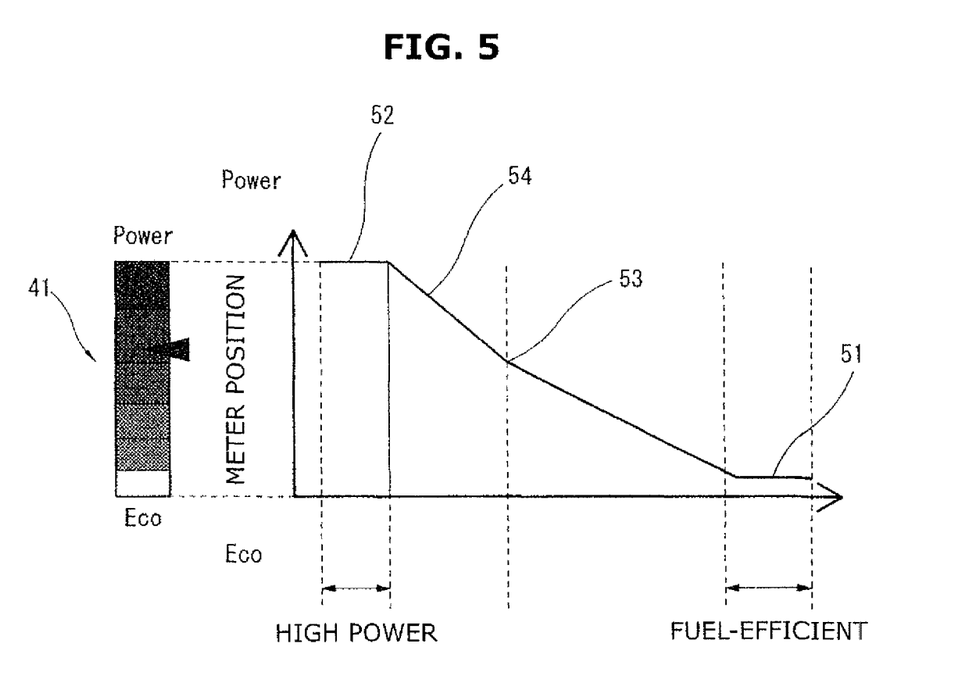
FIG. 5 is an explanatory chart showing how to indicate the engine compression ratio, according to a first embodiment of the present invention.

FIG. 5 shows a relationship between the engine compression ratio and its indication. Indicator section 41 is set with dead zones 51, 52 of the engine compression ratio in which indicator section 41 maintains its indication constant with respect to a change in the engine compression ratio. Dead zone 51 on high compression ratio side includes a vicinity of the maximum compression ratio including the maximum compression ratio. Dead zone 52 on low compression ratio side includes a vicinity of the minimum compression ratio including the minimum compression ratio. In a case employing an analog manner of indication, a setting map shown in FIG. 5 may be set such that the indication shows an extremely small change in the dead zones which is unrecognizable to the driver.

Regarding the vicinity of the minimum compression ratio, when in maximum power region R2 (see FIG. 3) where the engine compression ratio is set higher than the minimum compression ratio, the indication of indicator section 41 is set as for dead zone 52, i.e. set at the one corresponding to the minimum compression ratio.

For example, when a driver continues to depress an accelerator pedal and causes the engine power to shift into maximum power region R2 so that the engine compression ratio increases from the minimum compression ratio to compression ratio ε0 (>εmin) at the maximum power, direct indication of the actual compression ratio would be liable to give the driver an impression that the engine compression ratio rises and the engine power falls temporarily. In contrast, according to the first embodiment, even with such a shift into maximum power region R2, the provision of dead zone 52 serves to keep the indication of the engine compression ratio as for the minimum compression ratio εmin, and thereby suppress the driver from incorrectly recognizing that the engine power has fallen.

Furthermore, the provision of dead zone 51 also for the vicinity of the maximum compression ratio, i.e. for a vicinity of the minimum power, serves to maintain the indication of the engine compression ratio as for the maximum compression ratio, i.e. as for energy-conserving state ("Eco"), over a wide range close to the minimum power, and thereby encourage a driver to keep a state of energy conserving drive, when the driver desires to do so.

Indicator section 41 is further configured to change its indication linearly with change in the engine compression ratio, to reflect the state of the engine compression ratio faithfully. Additionally, indicator section 41 is configured to have a section 54 where the linear change with change in the engine compression ratio has a greater gradient to enlarge a change in the indication with respect to change in the engine compression ratio, wherein section 54 is on lower compression ratio side (higher power side) of an intermediate compression ratio at an intermediate point 53 substantially at a central point between the minimum and maximum compression ratio.

The enlargement of the gradient of the linear change on the low compression ratio side (high power side) allows the indication of the engine compression ratio to change more quickly in the direction of decrease in the compression ratio (in the direction of increase in power), and thereby allows a driver to recognize more clearly that the state of driving is shifting in the direction of decrease in the compression ratio (in the direction of increase in power).

Figure 6A:
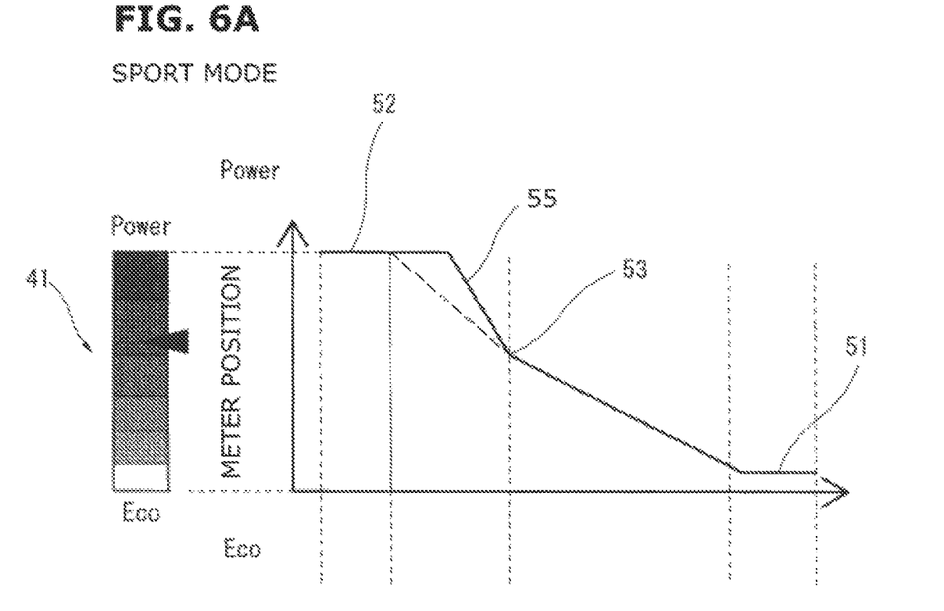
FIGS. 6A and 6B are explanatory charts showing how to indicate the engine compression ratio when in a sport mode and when in an economy mode, respectively, according to a second embodiment of the present invention.
Figure 6B:
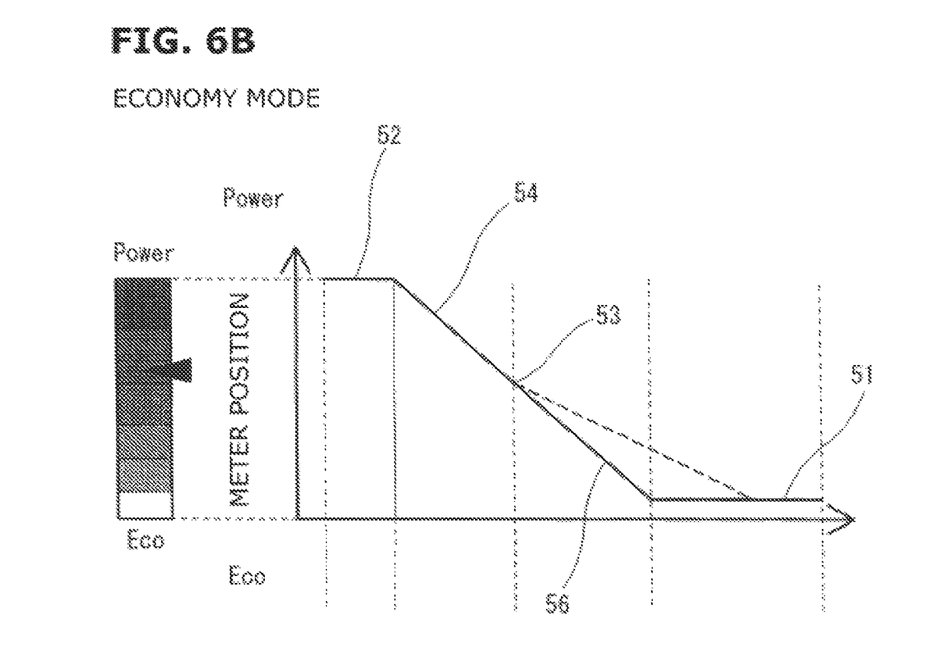

FIGS. 6A and 6B show relationships between the engine power and the indication of the engine compression ratio, according to the second embodiment of the present invention. The second embodiment includes a gradient-varying means configured to allow a driver to vary the gradient of the linear change by operation of a drive mode switch 57 (see FIG. 1).

Drive mode switch 57 is configured to perform switching into a sport mode for engine power priority and into an economy mode for energy conservation priority. The sport mode and the economy mode relatively employ characteristics of FIGS. 6A and 6B. Broken lines in FIGS. 6A and 6B correspond to a normal mode as in FIG. 5 for the first embodiment, where none of the sport mode and the economy mode is selected.

As shown in FIG. 6A, the sport mode is set such that the linear change on lower compression ratio side (higher power side) of intermediate point 53 has a greater slope 55 than in the normal mode so that dead zone 52 on the low compression side is wider than in the normal mode, wherein the indication of the minimum compression ratio is maintained in dead zone 52. The setting of the sport mode that the linear change on the low compression ratio side (high power side) has greater slope 55 and dead zone 52 on the low compression ratio side is wider, serves to impress a sense of acceleration on a driver.

As shown in FIG. 6B, the economy mode is set such that the linear change on higher compression ratio side (lower power side) of intermediate point 53 has a greater slope 56 than in the sport mode so that dead zone 51 on the high compression ratio side (low power side) is wider than in the sport mode, wherein the indication of the maximum compression ratio is maintained in dead zone 51. The setting of the economy mode that the linear change on the high compression ratio side (low power side) has greater slope 56 and dead zone 51 on the high compression ratio side is wider, serves to impress a sense of energy conservation on a driver.

Figure 7:
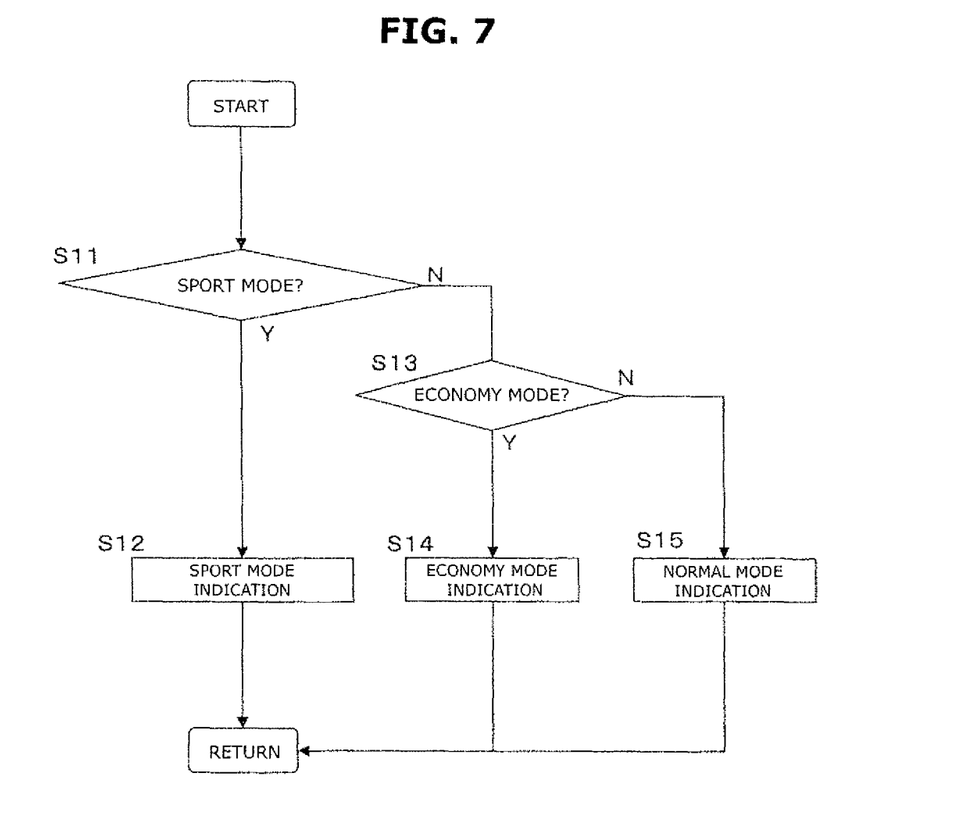
FIG. 7 is a flow chart showing a process of control according to the second embodiment.

FIG. 7 is a flow chart showing a process of control according to the second embodiment described above. This routine is memorized and executed by control unit 6. At Step S11, control unit 6 judges whether or not the sport mode is selected by drive mode switch 57. When the sport mode is selected, control unit 6 then proceeds to Step S12 where control unit 6 selects a setting map of FIG. 6A and indicates the engine compression ratio by using the selected setting map. When the sport mode is not selected, control unit 6 then proceeds to Step S13 where control unit 6 judges whether or not the economy mode is selected by drive mode switch 57. When the economy mode is selected, control unit 6 then proceeds to Step 14 where control unit 6 selects a setting map of FIG. 6B and indicates the engine compression ratio by using the selected setting map. When both of answers to Steps S11 and S13 are negative, control unit 6 then proceeds to Step S15 where control unit 6 selects the setting map of the normal mode shown in FIG. 5 and indicates the engine compression ratio by using the selected setting map.

The following is a list of characteristic configurations and functions of one or more of the above embodiments.

[1] One or more embodiments of the present invention is provided with variable compression ratio mechanism 20 structured to vary the engine compression ratio of the internal combustion engine, and includes display 40 that displays the current state of engine compression ratio. Generally, the engine compression ratio is not so sensitively adjusted with respect to change in the engine load or the engine rotation speed, but is maintained constant with respect to a slight change in the engine load or the engine rotation speed. Therefore, the indication of the engine compression ratio does not change frequently. This serves to allow a driver to recognize a state of energy conserving drive also during acceleration of the vehicle, when the vehicle is driven with the engine compression ratio set in a state of favorable energy conservation. This serves to suppress a driver from depressing the accelerator pedal excessively, when the driver desires to keep a state of energy conserving drive.

In addition, in view of a present environment where no vehicle is provided with a variable compression ratio mechanism, the display of the engine compression ratio serves to allow a driver to have an impression that the engine compression ratio is varying actually, i.e. the variable compression ratio mechanism is acting actually.

[2] The engine compression ratio is set high to improve the thermal efficiency and reduce the fuel consumption, when the engine load or the engine rotation speed is low. On the high compression ratio side of indicator section 41, the mark indicating energy conservation is provided. This mark allows a driver to intend to operate the accelerator not to deviate from this mark evoking energy conservation, and thereby achieve a state of energy conserving drive.

[3] The engine compression ratio is set low to suppress occurrences of knocking and pre-ignition, when the engine load or the engine rotation speed is high. On the low compression ratio side of indicator section 41, the mark indicating high power is provided. This mark allows a driver to recognize a state of high-power drive. When such a state of high-power drive is against driver's intention, the mark encourages a driver to ease up on the accelerator.

[4] One or more embodiments of the present invention is further provided with turbocharger 2 to supercharge intake air, and display 40 includes boost pressure indicator section 45 to indicate the state of supercharging in addition to the indication of the engine compression ratio. The employment of both of variable compression ratio mechanism 20 and turbocharger 2 allows the boost pressure to be raised sufficiently to about 200 kPa when in the state of low compression ratio. The further indication of the boost pressure on boost pressure indicator section 45 allows a state of high power to be recognized impressively.

Although the present invention has been described with reference to the specific embodiments, the present invention is not limited to the embodiments, but includes various modifications thereof. For example, the form of indication of the engine compression ratio and the boost pressure on the display is not limited to the embodiments, but may be implemented by another form such as an analog display device. Moreover, although the display according to the above embodiments is configured to display the indication of the current engine compression ratio sensed by the control shaft sensor, the display is not so limited but may be configured to indicate a target compression ratio that is set on the basis of the engine load and the engine rotation speed etc. Furthermore, although the engine compression ratio is indicated by moving the cursor according to the above embodiments, the indication of the engine compression ratio is not so limited but may be implemented by light-emitting similar to the boost pressure indicator section.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A display device for an internal combustion engine including a variable compression ratio mechanism structured to vary an engine compression ratio of the internal combustion engine, the display device comprising:
    an indicator section structured to provide an indication of the engine compression ratio wherein the indication is variable depending on information of the engine compression ratio inputted from a control unit connected to the display device,
    wherein the indicator section maintains the indication of the engine compression ratio to be substantially constant or to be within a slight change with respect to a change in the engine compression ratio within at least one of first and second dead zones of the engine compression ratio,
    wherein the first dead zone includes a vicinity of an upper limit of the engine compression ratio including the upper limit, and
    wherein the second dead zone includes a vicinity of a lower limit of the engine compression ratio including the lower limit.

2. The display device according to claim 1,
    wherein the internal combustion engine is set with a first operation region in which the engine compression ratio is set to decrease with increase in engine power of the internal combustion engine, and a second operation region in which the engine power is higher than in the first operation region and the engine compression ratio is set higher than the lower limit, and
    wherein the indicator section is configured to set the indication as for the at least one of the first and second dead zones, when the internal combustion engine is in the second operation region.

3. The display device according to claim 2,
    wherein the internal combustion engine is configured to set the engine compression ratio to increase with decrease in engine load or engine rotation speed of the internal combustion engine, and
    wherein the indicator section includes a high compression ratio side including a mark indicating energy conservation.

4. The display device according to claim 2,
    wherein the internal combustion engine is configured to set the engine compression ratio to decrease with increase in engine load or engine rotation speed of the internal combustion engine, and
    wherein the indicator section includes a low compression ratio side including a mark indicating high power.

5. The display device according to claim 2, wherein the indicator section is configured to set the indication to change linearly with change in the engine compression ratio.

6. The display device according to claim 5, further comprising:
    a switch configured to switch the internal combustion engine into a sport mode for engine power priority and into an economy mode for energy conservation priority,
    wherein the linear change has a greater gradient for a range of the engine compression ratio in the sport mode than in the economy mode, and
    wherein the range is lower in the engine compression ratio than an intermediate point of the engine compression ratio.

7. The display device according to claim 5, further comprising:
    a switch configured to switch the internal combustion engine into a sport mode for engine power priority and into an economy mode for energy conservation priority,
    wherein the linear change has a greater gradient for a range of the engine compression ratio in the economy mode than in the sport mode, and
    wherein the range is higher in the engine compression ratio than an intermediate point of the engine compression ratio.

8. The display device according to claim 5,
    wherein the indicator section is configured to enlarge a change of the indication with respect to change in the engine compression ratio by enlarging a gradient of the linear change with change in the engine compression ratio for a first range of the engine compression ratio, and
    wherein the first range is lower or higher in the engine compression ratio than an intermediate point of the engine compression ratio.

9. The display device according to claim 5, further comprising a gradient-varying means configured to vary a gradient of the linear change.

10. The display device according to claim 1,
    wherein the internal combustion engine is configured to set the engine compression ratio to increase with decrease in engine load or engine rotation speed of the internal combustion engine, and
    wherein the indicator section includes a high compression ratio side including a mark indicating energy conservation.

11. The display device according to claim 10, wherein the indicator section is configured to set the indication to change linearly with change in the engine compression ratio.

12. The display device according to claim 1,
wherein the internal combustion engine is configured to set the engine compression ratio to decrease with increase in engine load or engine rotation speed of the internal combustion engine, and
wherein the indicator section includes a low compression ratio side including a mark indicating high power.

13. The display device according to claim 12, wherein the indicator section is configured to set the indication to change linearly with change in the engine compression ratio.

14. The display device according to claim 1, wherein the indicator section is configured to set the indication to change linearly with change in the engine compression ratio.

15. The display device according to claim 14, further comprising:
a switch configured to switch the internal combustion engine into a sport mode for engine power priority and into an economy mode for energy conservation priority,
wherein the linear change has a greater gradient for a range of the engine compression ratio in the sport mode than in the economy mode, and
wherein the range is lower in the engine compression ratio than an intermediate point of the engine compression ratio.

16. The display device according to claim 14, further comprising:
a switch configured to switch the internal combustion engine into a sport mode for engine power priority and into an economy mode for energy conservation priority,
wherein the linear change has a greater gradient for a range of the engine compression ratio in the economy mode than in the sport mode, and
wherein the range is higher in the engine compression ratio than an intermediate point of the engine compression ratio.

17. The display device according to claim 14,
wherein the indicator section is configured to enlarge a change of the indication with respect to change in the engine compression ratio by enlarging a gradient of the linear change with change in the engine compression ratio for a first range of the engine compression ratio, and
wherein the first range is lower or higher in the engine compression ratio than an intermediate point of the engine compression ratio.

18. The display device according to claim 14, wherein a switch is configured to vary a gradient of the linear change.

* * * * *